June 2, 1970      R. W. WILLIAMS      3,515,854
CONDUCTIVE BAKING OVEN
Filed Nov. 5, 1968
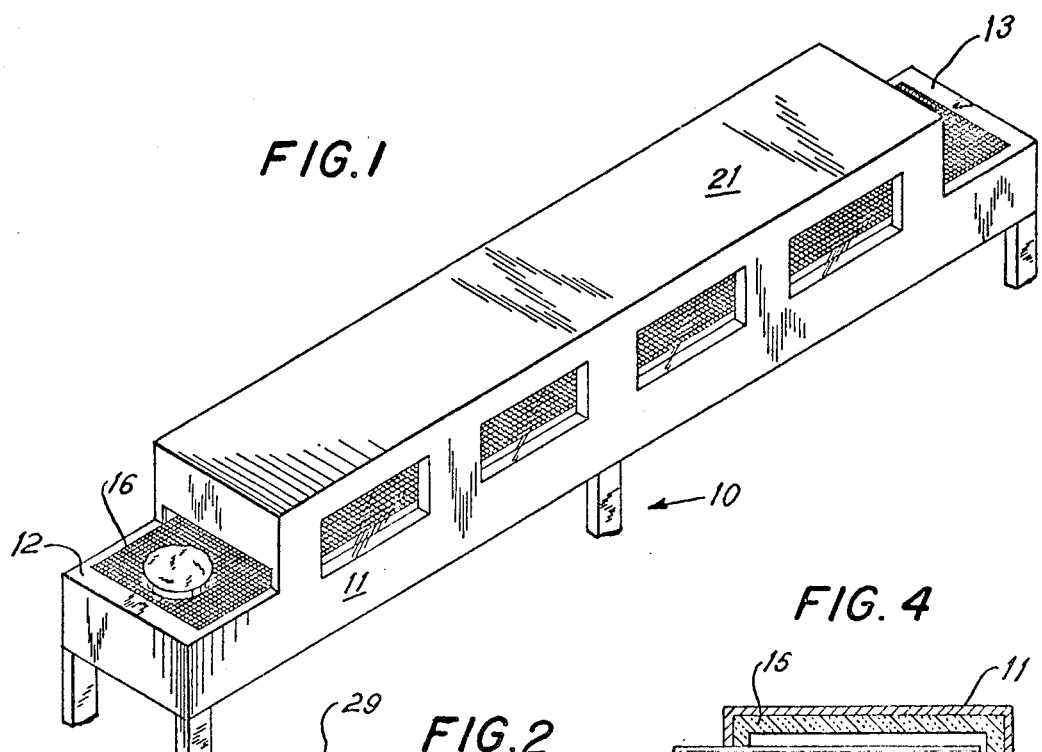
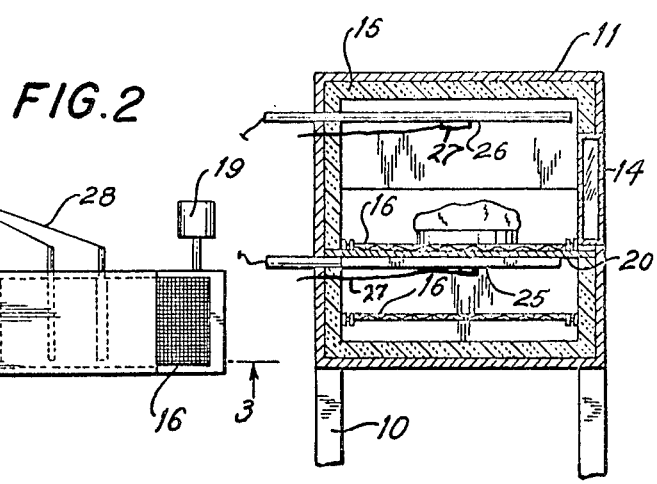
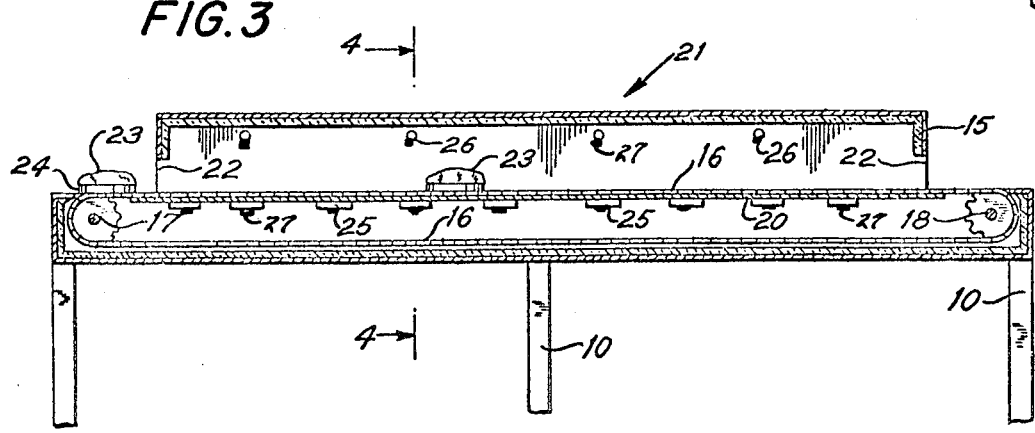

United States Patent Office 3,515,854
Patented June 2, 1970

3,515,854
CONDUCTIVE BAKING OVEN
Robert W. Williams, Brookville Road,
Brookville, N.Y. 12026
Continuation-in-part of application Ser. No. 471,653,
July 13, 1965. This application Nov. 5, 1968, Ser.
No. 773,502
Int. Cl. A21b 1/22, 1/40; F27b 9/06
U.S. Cl. 219—388                                           1 Claim

ABSTRACT OF THE DISCLOSURE

This invention relates to a novel conveyor method and apparatus for conductively baking food products such as frozen pastry products, meat products and the like. The baking is done by the application of conductive heat to the bottom area of the products disposed on a heated chain mesh conveyor in rubbing contact with a longitudinal heat sink plate, thereby fully baking the products upwardly. The plate is of suitable bulk thickness and is divided into a plurality of thermostatically and separately controlled heat zones by supplying localized heat centrally to each zone by securing electrical heat resistant means thereto. A tunnel oven is disposed over said moving conveyor with said plate therebeneath and is provided with a plurality of spaced-apart, zoned, thermostatically and separately controlled radiant heaters for producing merely a top coloration on the baking products.

---

This invention is a continuation-in-part of patent application Ser. No. 471,653 filed July 13, 1965.

It is an objective of this invention to provide a baking oven adapted to bake conductively and upwardly products disposed therein.

It is another objective to provide a method of baking products wherein the baking is accomplished upwardly by zoned conductive heat whereas an eye-appeal coloration is supplied to the top of the baking products by means of zoned and separately controlled radiant heaters.

These and other objectives of this invention will become apparent upon reading the following descriptive disclosure of an illustrative embodiment taken in conjunction with the accompanying drawing, in which:

FIG. 1 is a perspective view of the oven,
FIG. 2 is a top plan view of the oven,
FIG. 3 is a section view taken on line 3—3 of FIG. 2, and
FIG. 4 is a section view taken on line 4—4 of FIG. 3.

Turning to the drawing, a conventional structural support 10 is provided with a housing 11 of a rectangular configuration. The housing is provided with an inlet platform 12 at its front portion and with an outlet platform 13 at its rear portion. This housing is further provided with conventional thermal windows 14 to permit viewing of the top coloration of the baking products as they progress through the oven.

A continuous mesh chain conveyor 16 extends from an idler roller 17 disposed at the front platform 12 to a drive roller 18 disposed at the rear platform 13. An electrical motor 19 provides power to the drive roller 18. The power to drive the apparatus may be other than electrical. The chain conveyor 16 is mated suitably to conventional sprockets disposed on rollers 17 and 18 to produce a positive traction thereof.

The top portion of the conveyor 16 rubbingly and slidingly engages the entire surface of a unitary longitudinal heat sink metal plate 20, preferably of about 12 gauge sheet metal. This plate is of sufficient mass or bulk to function as a heat bank or reservoir to smoothly supply heat to the conveyor without sudden heat changes or heat shock effect prevalent if thin sheet metal is employed. All of the ilnks of the mesh chain conveyor 16 engage the entire plate 20 longitudinally in their travel thereover to continuously absorb the varying conductive heat from the plate for direct transfer to the bottom of the products being baked.

The openings 22 of the hood 21 at both the front and the rear of the oven are of a height to permit passage of the products being baked, preferably in pans 24.

An important feature of this invention is the provision of zoned separately thermostatically controlled heating elements 25 preferably secured directly to the heat bank plate 20. Preferably long electrical heating elements 25 of suitably large cross section are secured intimately and transversely to the underside of plate 20.

The heating elements 25 may be welded or bolted to said plate. The use of wide heating elements 25 permits a large amount of heat energy to be transferred to plate 20 in a minimum of time. Preferably the plate 20 is divided into six heat zones but this number may be varied.

The inside chamber under the hood 21 is provided also with zoned separately thermostatically controlled radiant heaters 26. Preferably, the hood chamber is divided into three radiant heat zones, but this number may be varied depending upon the products being baked.

The heating elements 25 and 26 are each thermostatically set and thus controlled individually on all the zone heaters by thermostats 27. The wires 28 from the separate heaters 25 and 26 are lead to a common control box 29 to facilitate individual control of each heater as the conditions of baking demand, such conditions varying with the volume of products being baked and the kind and size of product being baked.

Thus the overall heat pattern of conductive heat of the entire heat plate 20 is variable at will by separate manipulation of the separate heaters 25.

Similarly the overall heat pattern of top coloration of the baking products is variable and controlled at will by the separate manipulation of the separate radiant heaters 26.

The use of appropriate thermostats 27 will maintain the pre-selected heat pattern for both the heat plate 20 and also for the radiant heaters 26.

In the baking of food products disposed in the chain mesh conveyor 16, the products enter at inlet opening 22 and thereafter encounter conditions under the hood 21 to bring about a baking in the absence of convectional heat currents normally used to bake products. There are no significant convection heat currents present during baking in the apparatus of this invention.

The following examples illustrate the method used in the baking of specific products using this invention with three independently controlled top electrical radiant heaters 26 and six bottom heaters 25 in direct conductive contact with the bottom heat sink plate 20, which latter slidingly engages conveyor 16 top portion disposed thereon.

EXAMPLE I

Product baked: Enriched bread.
Bottom heat applied to the respective suitably spaced-apart or zone heaters to define six heating zones commencing with the first zone being adjacent to the inlet opening;

| Zone, No.: | Degrees F. |
|---|---|
| 1 | 500 |
| 2 | 500 |
| 3 | 450 |
| 4 | 450 |
| 5 | 425 |
| 6 | 425 |

Top heat for coloration of products applied to three substantially equally spaced-apart radiant heaters to define three heating zones with the first zone being closest to the inlet opening:

| Radiant zone, No.: | Degrees F. |
|---|---|
| 1 | 350 |
| 2 | 300 |
| 3 | 325 |

In this example a baking time of 30 minutes produced a fully baked bread of ideal coloration.

EXAMPLE II

The same oven having the same three top radiant heaters and the same six bottom heaters used in Example I was employed to bake Danish pastry. The conditions yielding a fully baked product of excellent eye-appeal coloration was as follows:

| Bottom zone, No.: | Degrees F. |
|---|---|
| 1 | 450 |
| 2 | 400 |
| 3 | 400 |
| 4 | 400 |
| 5 | 400 |
| 6 | 425 |

| Top zones, No.: | Degrees F. |
|---|---|
| 1 | 350 |
| 2 | 350 |
| 3 | 350 |

The time required to bake the Danish pastry was 17 minutes.

EXAMPLE III

In this example a ten inch pie was baked in the same oven described above in Examples I and II for an overall time of 42 minutes.

| Bottom zones, No.: | Degrees F. |
|---|---|
| 1 | 550 |
| 2 | 550 |
| 3 | 550 |
| 4 | 500 |
| 5 | 500 |
| 6 | 525 |

The three top coloration radiant heaters were set as follows:

| No.: | Degrees F. |
|---|---|
| 1 | 300 |
| 2 | 300 |
| 3 | 300 |

The final product was a fully baked pie having a dry well baked bottom crust and a top crust of excellent light coloration without burnt edges.

In this invention the heat sink plate is at least twelve guage in thickness.

According to this invention, the bottom heat is always substantially higher in degrees F. than the top heat. Bottom heat is added as needed by thermostatic response to demand for bottom heat. Likewise, top heat is separately added as needed by thermostatic response for demand for top heat. All heat is added on a zone basis. More than one burner may be used in each zone but only one thermostat is present in each zone. Thus top heat and bottom heat are independently applied and on an independent zone basis.

I claim:

1. A conductive oven for continuously baking food products by conductive heat comprising, a continuous integral unitary longitudinal heat sink plate of at least twelve guage thickness; a plurality of spaced-apart separately controlled electrical heating means directly contacting the bottom surface of said plate dividing it into a like plurality of separately controlled heat zones; electrical control means connected to each of said heating means for controlling the heat supplied thereto; a longitudinal continuous mesh chain conveyor having the top portion thereof slidingly contacting the top surface of said heat sink plate for conductive heat transfer thereto; a longitudinal hood disposed substantially over the entire longitudinal surface of said plate and suitably above said conveyor portion disposed thereon to form a suitably large chamber to effect coloration of food products therein; and a zoned plurality of spaced-apart separately controlled electrical radiant heaters disposed within said hood and over said plate and conveyor, the radiant rays of which directly produce a top coloration to the products being baked upwaardly by conductive heat selectively applied from said heat sink plate.

References Cited

UNITED STATES PATENTS

| 1,124,566 | 1/1915 | Wescott | 219—388 |
| 2,120,829 | 6/1938 | Bolling | 107—57 |
| 3,119,354 | 1/1964 | Gawlitza et al. | |
| 3,249,741 | 3/1966 | Mills | 219—388 |

FOREIGN PATENTS

| 462,215 | 3/1951 | Italy. |

DANIEL BLUM, Primary Examiner

U.S. Cl. X.R.

107—54, 57